(12) United States Patent
Smith et al.

(10) Patent No.: US 10,496,271 B2
(45) Date of Patent: Dec. 3, 2019

(54) BI-DIRECTIONAL CONTROL FOR TOUCH INTERFACES

(71) Applicant: Bose Corporation, Framingham, MA (US)

(72) Inventors: Matthew C. Smith, Needham, MA (US); Jack D. Davis, Wellesley, MA (US)

(73) Assignee: Bose Corporation, Framingham, MA (US)

( * ) Notice: Subject to any disclaimer, the term of this patent is extended or adjusted under 35 U.S.C. 154(b) by 368 days.

(21) Appl. No.: 15/011,062

(22) Filed: Jan. 29, 2016

(65) Prior Publication Data

US 2017/0220239 A1    Aug. 3, 2017

(51) Int. Cl.
*G06F 3/048* (2013.01)
*G06F 3/0488* (2013.01)
*G06F 3/0484* (2013.01)
*G06F 3/0485* (2013.01)

(52) U.S. Cl.
CPC ........ *G06F 3/04883* (2013.01); *G06F 3/0485* (2013.01); *G06F 3/04845* (2013.01); *G06F 3/04886* (2013.01)

(58) Field of Classification Search
None
See application file for complete search history.

(56) References Cited

U.S. PATENT DOCUMENTS

| 5,943,044 A * | 8/1999 | Martinelli ........... G06F 3/03547 178/18.01 |
| 6,453,022 B1 | 9/2002 | Weinman, Jr. |
| 6,469,633 B1 | 10/2002 | Wachter |
| 7,149,475 B2 | 12/2006 | Kawamura |
| 7,181,023 B1 | 2/2007 | Andrews et al. |

(Continued)

FOREIGN PATENT DOCUMENTS

| EP | 0673588 A1 | 9/1995 |
| JP | 05048421 U | 6/1993 |

(Continued)

OTHER PUBLICATIONS

Escient; FireBall; DVD and Music Manager; DVDM-100; Installation and User's Guide; Manual No. M22003-01A3; Revision 1.2 Jul. 2004; copyright @2003-2004.

(Continued)

*Primary Examiner* — William C Trapanese
(74) *Attorney, Agent, or Firm* — Brian M. Dingman; Dingman IP Law, PC

(57) ABSTRACT

A user interface for an electronic device incorporating a touch sensitive display forms a touch input zone on a portion of the display. The touch input zone is split into two sections separated by an origin axis. The origin axis may be fixed or may be determined by an initial touch by a user in the touch zone. The device detects a touch by the user in the touch zone and changes a controllable variable or a pointer to an item within a scrollable list of data elements based on the location of the detected touch relative to the origin axis, where the rate of change is determined by the distance from the touch location to the origin axis and the direction of change is determined by the section in which the touch is detected.

20 Claims, 8 Drawing Sheets

(56) References Cited

U.S. PATENT DOCUMENTS

| | | | |
|---|---|---|---|
| 7,483,538 B2 | 1/2009 | McCarty et al. | |
| 7,571,014 B1 | 8/2009 | Lambourne et al. | |
| 7,643,894 B2 | 1/2010 | Braithwaite et al. | |
| 7,668,936 B1 | 2/2010 | Krikorian et al. | |
| 7,917,082 B2 | 3/2011 | Goldberg et al. | |
| 8,234,395 B2 | 7/2012 | Millington | |
| 8,588,949 B2 | 11/2013 | Lambourne et al. | |
| 2002/0194596 A1 | 12/2002 | Srivastava | |
| 2003/0073432 A1 | 4/2003 | Meade, II | |
| 2005/0110768 A1* | 5/2005 | Marriott | G06F 3/03547 345/173 |
| 2005/0152524 A1 | 7/2005 | Carlson et al. | |
| 2006/0121985 A1* | 6/2006 | Nakanishi | A63F 13/10 463/36 |
| 2012/0030634 A1* | 2/2012 | Miyazaki | G06F 3/04847 715/863 |
| 2013/0235070 A1* | 9/2013 | Webb | G09G 5/02 345/594 |
| 2015/0234529 A1* | 8/2015 | Kim | G06F 3/0416 345/173 |

FOREIGN PATENT DOCUMENTS

| | | |
|---|---|---|
| JP | 504316 | 5/1996 |
| JP | 2000236597 | 8/2000 |
| JP | 2001230641 | 8/2001 |
| JP | 2001516197 | 9/2001 |
| JP | 2002199474 | 7/2002 |
| JP | 2003264893 | 9/2003 |
| JP | 2003009025 | 10/2003 |
| WO | 9510927 A1 | 4/1995 |
| WO | 9909787 A1 | 2/1999 |

OTHER PUBLICATIONS

Escient; FireBall; E2 User's Manual; P/N M22004-01A3.
Escient; FireBall; AVX & MX Series User's Manual; P/N: M42001-02A1.
Palenchar, Joseph; Avega Uses Wireless, UPnP to Network Home Speakers; Twice; Jan. 5, 2006; pp. 1-3; downloaded from the internet on Dec. 18, 2017; http://www.twice.com/product/avega-upnp-network-home-speakers-2973.
Phillips, Wes; Avega: Wireless Is More; Stereophile.com; Jan. 4, 2006; downloaded from the internet on Dec. 18, 2017; https://www.stereophile.com/ces2006/010406avega/index.html.
Kobrin, Mike; Avega's Oyster Is a Pearl; Wireless audio doesn't have to sound just so-so anymore; News & Opinion; PCMag.com; Jan. 6, 2006; downloaded from internet Dec. 18, 2017; https://www.pcmag.com/article2/0,2817,1908704.00.asp.
Wilkins, Nathaniel; Escient Fireball DVDM-100 review—CNET; Reviewed Dec. 14, 2004; downloaded from the internet on Dec. 18, 2017; https://www.cnet.com/products/escient-fireball-dvdm-100/review/.
Howard, Bill; Escient FireBall DVDM-100 Review & Rating; PCMag.com; Mar. 16, 2004; downloaded from the internet on Dec. 18, 2017; https://www.pcmag.com/article2/0,2817,1549587,00.asp.
Wilkins, Nathaniel; Escient FireBall E2 Digital Music Server review—Cnet; Jun. 14, 2006; downloaded from the internet on Dec. 18, 2017; https://www.cnet.com/products/escient-fireball-e2-400-400gb/review/.
Wilkins, Nathaniel; Escient FireBall E-40 Digital Music Manager review—CNET; Oct. 12, 2003; downloaded from internet on Dec. 18, 2017; https://cnet.com/products/escient-fireball-e-40-digital-music-manager/review/.
Antonoff, Michael; Escient FireBall SE-80 Digital Music Manager; Sound & Vision; Oct. 4, 2005; downloaded from the internet on Dec. 18, 2017; https://www.soundandvision.com/content/escient-fireball-se-80-digital-music-manager.
Digital Trends Staff; Wi-Fi Pearl to be Found in Oyster Speakers?; Digital Trends; posted on Jan. 2, 2006; downloaded from the internet on Dec. 18, 2017; https://www.digitaltrends.com/home-theater/wi-fi-pearl-to-be-found-in-oyster-speakers/.
Adam Dachis; How to Control the Audio and Video Scrubbing Speed on Your iPhone, last downloaded from the internet on May 12, 2016; http://lifehacker.com/5811660/how-to-control-the-audio-and-video-scrubbing-speed-on-your-iphone.
Wikipedia; Universal Plug and Play; downloaded from the Internet on Jan. 10, 2018; pp. 1-10; https://en.wikipedia.org/wiki/Universal_Plug_and_Play.

* cited by examiner

BI-DIRECTIONAL CONTROL FOR TOUCH INTERFACES

BACKGROUND

This disclosure relates to user interfaces (UI's) for touch input devices, and more specifically for touch input displays used with electronic devices such as tablets, smart phones, touch laptop computers, touch enabled display monitors and the like. Many devices provide user control over various operating parameters of the device. In many instances, a UI is operated by a user to increase or decrease a value or quantity associated with a software application the device is running. A UI may be provided for controlling volume or manipulating tone controls of an audio software application such as a streaming audio application. UI's are also used to control various other quantities where progressive increasing or decreasing of a quantity or variable, or directional scrolling through a list of data elements is desired. Previous examples of touch controls have difficulty in proving both gross (i.e. large) and fine grain control in a single control. All examples and features mentioned below can be combined in any technically possible way.

SUMMARY

In one aspect, a method for operating a UI of an electronic device having a touch sensitive display includes providing on the touch sensitive display a touch region having first and second touch zones separated by a first origin axis, detecting the location of a touch by a user in the touch region. Responsive to the detecting of the location of the touch in the touch region, causing one of: an increasing change in a controlled variable when the touch location is determined to be in the first touch zone or a decreasing change in the controlled variable when the touch location is determined to be in the second touch zone, wherein the rate of change of the controlled variable is dependent on the distance the detected touch location is displaced away from the origin axis.

Embodiments may include one of the following features, or any combination thereof. The value of the controllable variable is continually changed as long as a touch is detected. The value of the controllable variable stops changing when a touch is no longer detected. The origin axis is located in a fixed, predetermined location on the touch sensitive display. Sliding the location of the touch in a direction away from the origin axis to change the distance of the touch from the origin axis, and updating the rate of change of the controlled variable based on the change in distance of the location of the touch from the origin axis. Sliding the touch location towards the origin axis, whereupon when the sliding direction is changed from being away from the origin axis to being towards the origin axis, the change in the value of the controlled variable is switched to be decreasing if it was previously increasing, or switched to be increasing if it was previously decreasing in value. The location of the origin axis on the touch sensitive display is variable and is set by a first detected touch location, wherein the rate of change of the value of the controllable variable is determined by the detection of subsequent touch locations. Sliding the location of the touch in a direction away from the origin axis and updating the rate of change of the value of the controlled variable based on the change in distance of the location of the touch from the origin axis, as the touch location is slid away from the origin axis. Switching the direction in which the value of the controllable variable is changed when the direction of sliding is reversed.

In another aspect, a method for operating a UI of an electronic device having a touch sensitive display includes providing on the touch sensitive display a touch region having first and second touch zones separated by a first origin axis, detecting the location of a touch in the touch region, responsive to the detecting of the location of the touch in the touch region, causing one of: a change, in a first direction, of a pointer location pointing to a data element in a list of scrollable data elements when the touch location is determined to be in the first touch zone or a change, in a second direction, of the pointer location pointing to a data element in a list of scrollable data elements when the touch is determined to be in the second touch zone, wherein the rate of change in the pointer location is dependent on the distance the detected touch location is displaced away from the origin axis.

Embodiments may include one of the above and/or below features, or any combination thereof. The pointer location is continually changed as long as a touch is detected. The pointer location stops changing when a touch is no longer detected. The origin axis is located in a fixed, predetermined location on the touch sensitive display. Sliding the location of the touch in a direction away from the origin axis to change the distance of the touch from the origin axis, and updating the rate of change of the pointer location based on the change in distance of the location of the touch from the origin axis. Sliding the touch location towards the origin axis, whereupon when the sliding direction is changed from being away from the origin axis to being towards the origin axis, the change in the pointer location is switched to be in the second direction if it was previously in the first direction, or switched to be in the first direction if it was previously in the second direction. The location of the origin axis on the touch sensitive display is variable and is set by a first detected touch location, wherein the rate of change of the pointer location is determined by the detection of subsequent touch locations. Sliding the location of the touch in a direction away from the origin axis and updating the rate of change of the pointer location based on the change in distance of the location of the touch from the origin axis, as the touch location is slid away from the origin axis. Switching the direction in which the pointer location is changed when the direction of sliding is reversed, In another aspect, a method for operating a UI of an electronic device having a touch sensitive display includes providing on the touch sensitive display a touch region, responsive to a touch at a first location by a user in the touch region, setting a location of an origin axis at the location of the first touch and establishing first and second touch zones separated by the origin axis; detecting a slide of the first touch away from the origin axis; responsive to the detecting of the slide of the touch away from the origin axis, causing one of: an increasing change in a controlled variable when the slide is toward the first touch zone or a decreasing change in the controlled variable when the slide is toward the second touch zone, wherein the rate of change of the controlled variable is dependent on the distance the slide moves the touch location away from the origin axis.

In another aspect, a method for operating a UI of an electronic device having a touch sensitive display includes providing on the touch sensitive display a touch region, responsive to a touch at a first location by a user in the touch region, setting a location of an origin axis at the location of the first touch and establishing first and second touch zones separated by the origin axis; detecting a slide of the first touch away from the origin axis; responsive to the detecting of the slide of the touch away from the origin axis, causing one of: a change, in a first direction, of a pointer location pointing to a data element in a list of scrollable data elements when the slide is toward the first touch zone, or; a change, in a second direction, of the pointer location pointing to a data element in the list of scrollable data elements when the slide is toward the first touch zone, wherein the rate of change of the change in the pointer location is dependent on the distance the slide moves the touch location away from the origin axis.

DETAILED DESCRIPTION

Figure 1:
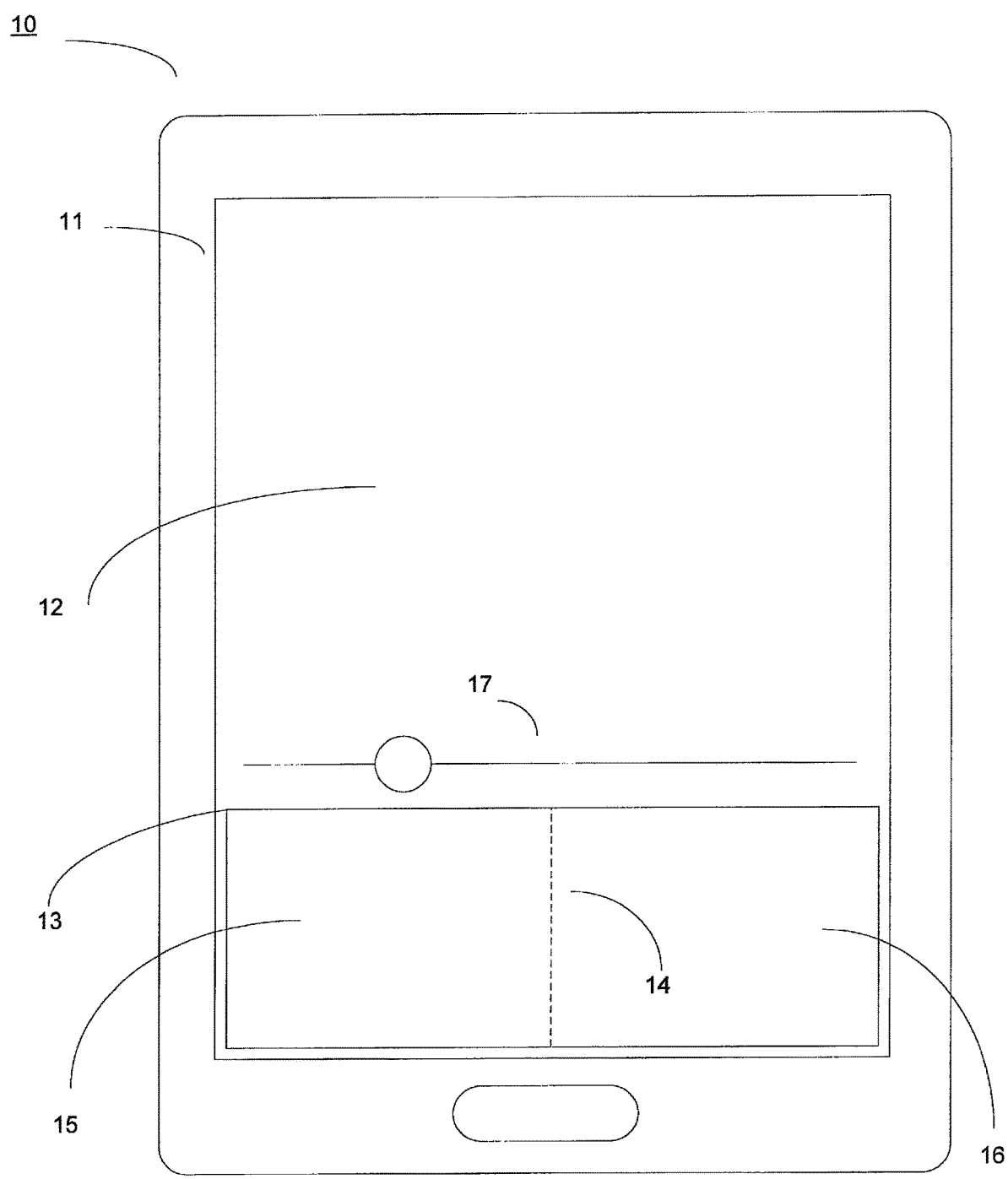
FIG. 1 is a schematic representation of an electronic device incorporating an implementation of a user interface element.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

The following examples are described and depicted in the figures in the context of a user interface (UI) for a smartphone application. However, the example UI's disclosed herein are not limited to use with smartphones, and are also useful for touch input devices and touch input displays used with electronic devices such as tablet computing devices, laptop computers, computer displays, remote controls, game controllers and the like. Example UI's disclosed herein may be used on any product that has a touch input device and has an element to be controlled by a UI, such as an audio system, a wireless speaker, a DVD player, a clock radio, a small appliance such as a coffee pot, toaster, toaster oven and the like, or a major appliance such as a stove, cooktop dishwasher, refrigerator, washing machine or dryer, etc.

Turning now to FIG. 1, a UI for a touch enabled display is shown. FIG. 1 depicts smartphone 10 with touch enabled display 11. Display 11 is split into two sections. Upper section 12 is used for outputting visual information by the smartphone, where the information displayed varies with the software application running on the smartphone. Section 12 may also accept touch input from the user to perform various UI functions. In FIG. 1, in addition to other information not shown, displayed in section 12 is a visual representation 17 of a linear control. In one non limiting example, linear control representation 17 depicts a volume control. In another non limiting example, linear control representation 17 depicts a tone control. It should be understood that linear control representation 17 can be associated with any variable or list of data where it is desired to change the variable or data, or scroll through the data in one of two directions. For a volume control, the control shows increasing or decreasing volume, with movement to the right depicting an increase in volume and movement to the left depicting a decrease in volume. In other applications, the representation could represent the increasing or decreasing of a tone control a balance control or other audio system control, the control of a clock, or the scrolling up or down through a list of data, such as a song list or artist list in a music player application, with the indicator 17 representing a relative location within the scrollable list of data. It should be understood that the UI's examples described herein may be used any data list that can be scrolled through, and are not limited in any way by the type of data contained within the list. Although linear control representation 17 is depicted as being located within upper section 12 of display 11, it is not restricted to this location and can in fact be located anywhere within display 11 desired. Though a linear control is depicted, the control need not be linear. For example, for a scrollable list of data elements, when the end of the list it reached scrolling may circle back to the beginning of the list or may stop until the user initiates an action that causes scroll direction to change. It should also be understood that use of a linear control representation is not required.

Lower section 13 of display 11 is operated as a touch zone for the example UI's disclosed herein. Origin 14 divides touch zone 13 into two sections 15 and 16. In FIG. 1, origin 14 is oriented vertically and splits section 13 into sections 15 and 16 that are arranged next to each other horizontally. It should be understood that other orientations of sections 15 and 16 are possible and origin 14 may be located anywhere within touch zone 13. In one non-limiting example, the location of origin 14 within touch zone 13 is fixed. A UI detects the location within touch zone 13 where a touch occurs and causes a change in a controlled variable based on the detected location. The detection of a touch in section 16 located to the right of origin 14 is associated with a value increase of a control variable or a scrolling through a list of data elements in a first direction. Similarly, a touch detected in section 15 located to the left of origin 14 is associated with a value decrease of a control variable or a scrolling through a list of data elements in a second direction. It should be noted, however, that the functions associated with the detection of a touch in the different sections could be reversed if desired.

Figure 2B:
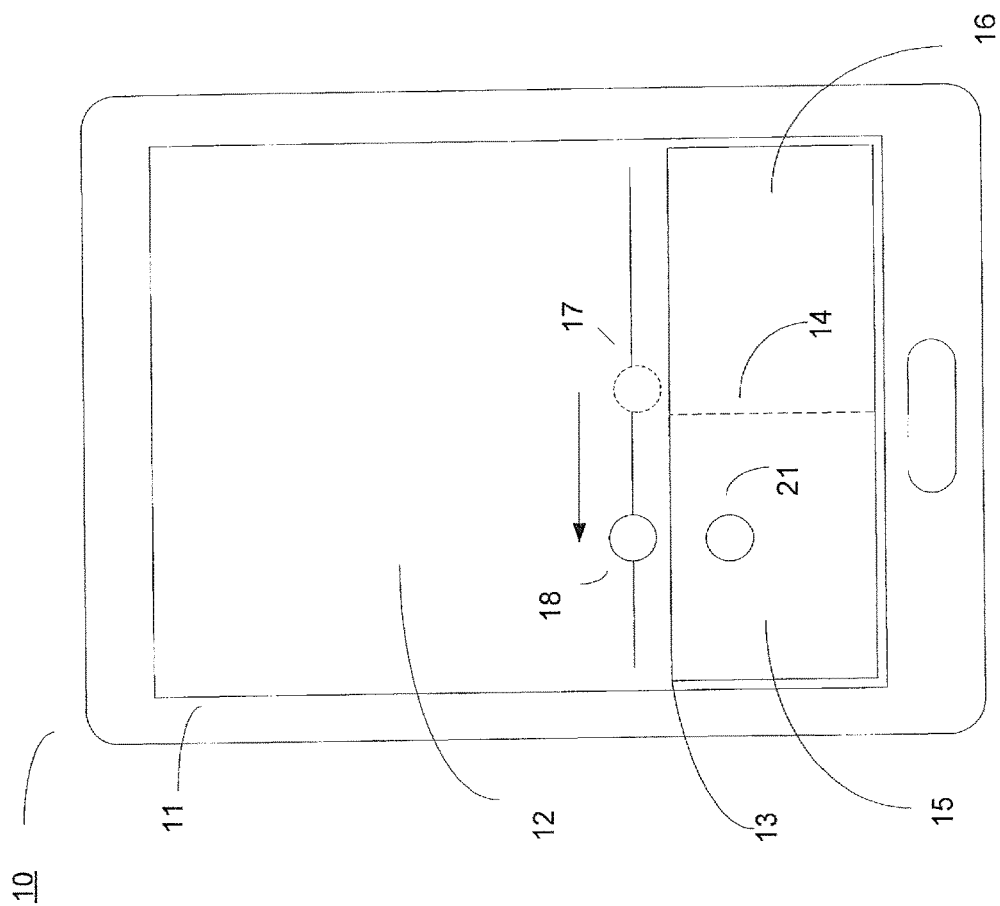
FIG. 2B is a schematic representation of an electronic device incorporating an implementation of a user interface element.
Figure 2A:
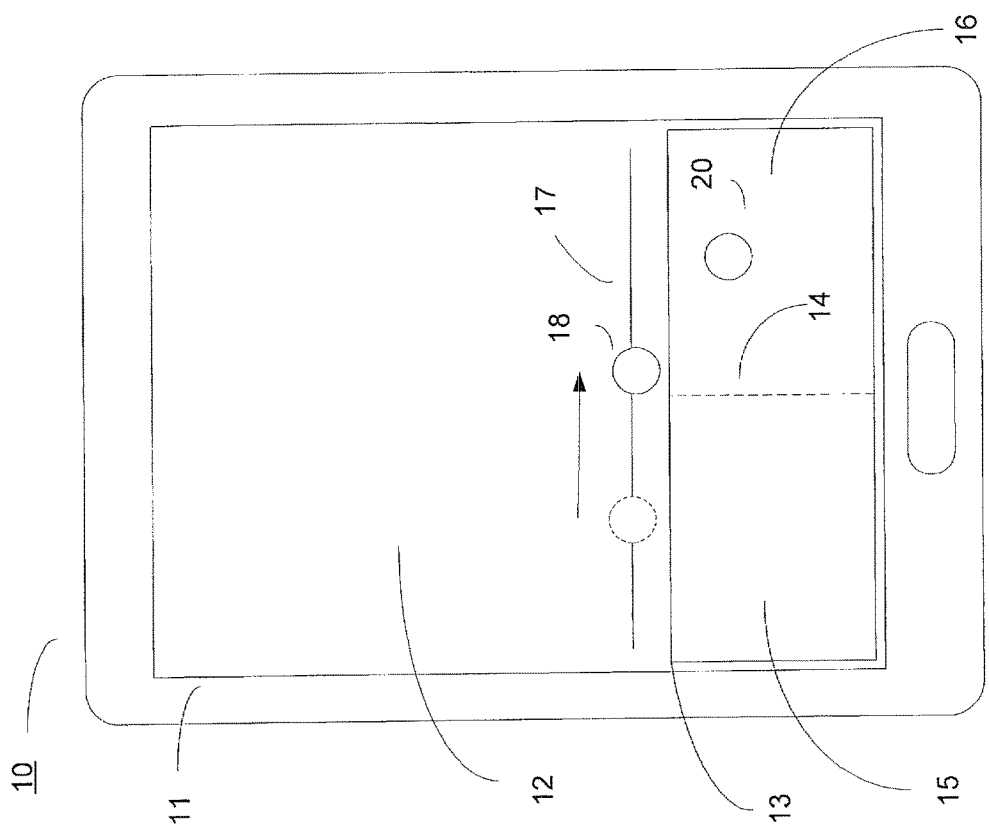
FIG. 2A is a schematic representation of an electronic device incorporating an implementation of a user interface element.
Figure 2D:
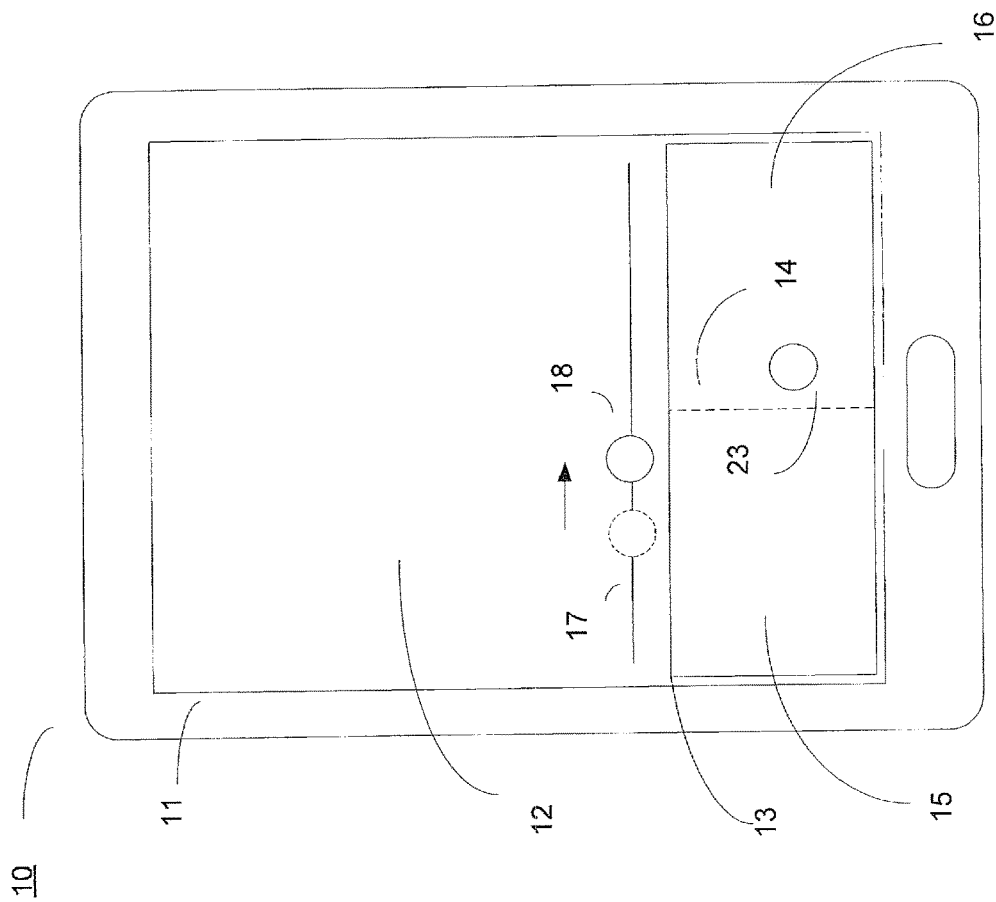
FIG. 2D is a schematic representation of an electronic device incorporating an implementation of a user interface element.
Figure 2C:
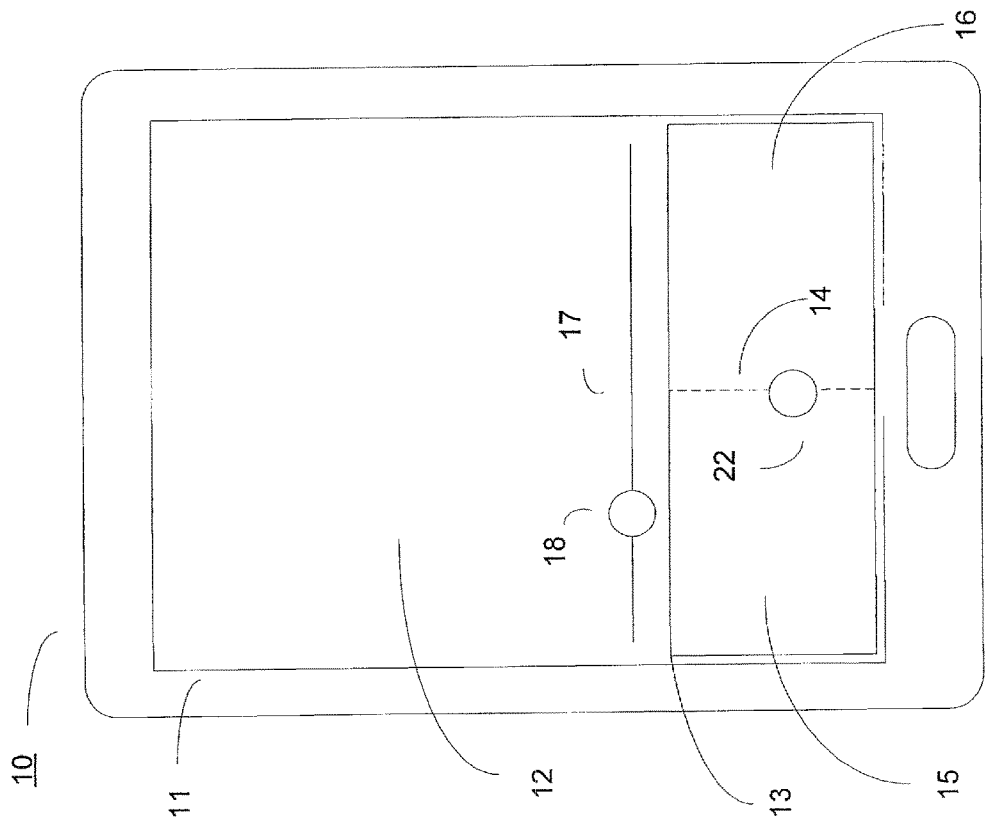
FIG. 2C is a schematic representation of an electronic device incorporating an implementation of a user interface element.

Turning now to FIGS. 2A-2E, further operation of an example UI is described. FIG. 2A depicts a touch 20 occurring in section 16 located to the right of origin 14, which results in an increase of a control variable or a scroll in a first direction through a list of data elements, and is represented by the movement to the right of control indicator 18 of control representation 17. FIG. 2B depicts a touch 21 in section 15 located to the left of the fixed origin 14 which results in a decrease of a control variable or a scroll in a second direction through a list of data elements, and is represented by the movement to the left of control indicator 18. FIG. 2C depicts a touch 22 located on origin 14 which results in no change of a control variable or no change in a pointer location of a scrollable list of data elements, as evidenced by the lack of movement of control indicator 18.

Figure 2E:
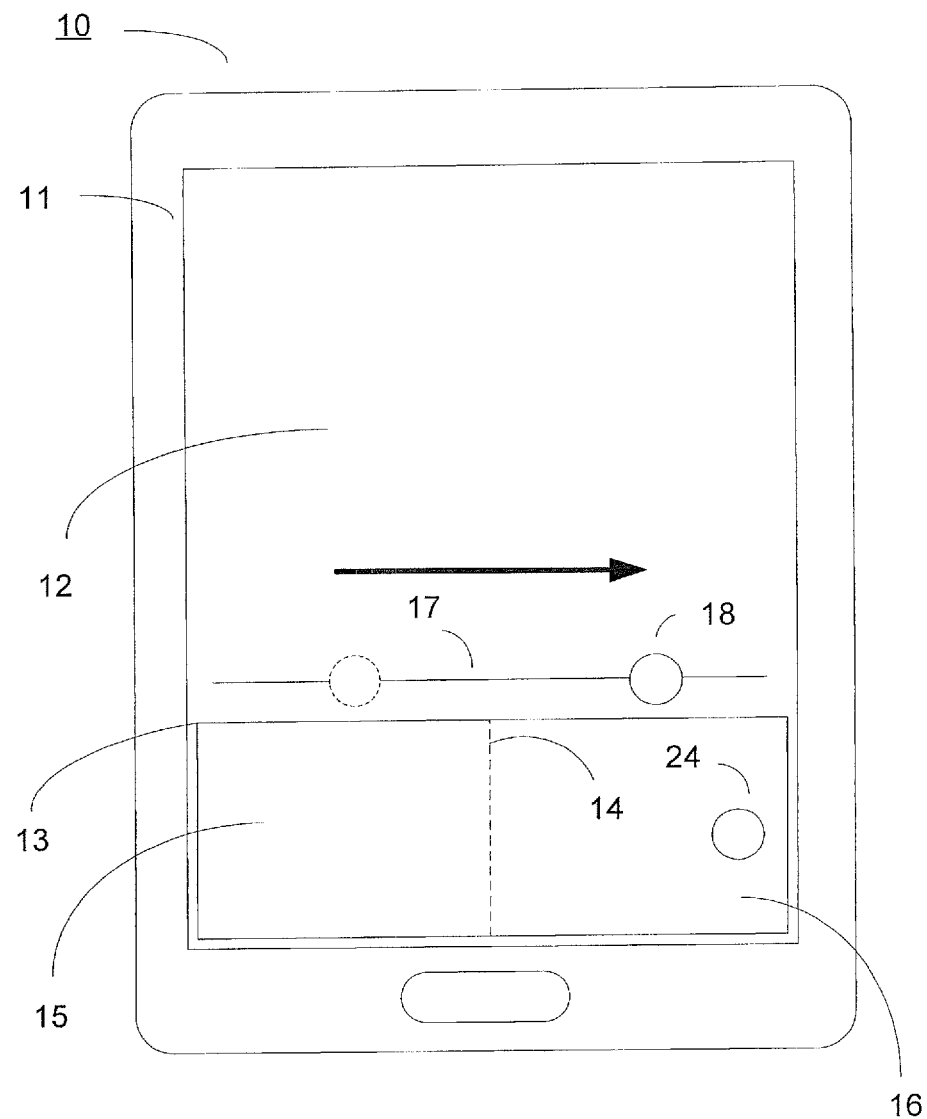
FIG. 2E is a schematic representation of an electronic device incorporating an implementation of a user interface element.

The distance from the origin of the touch location affects the degree to which a control variable is changed, or the extent to which a pointer location to a scrollable list of data elements is changed. FIG. 2D depicts a touch 23 located in section 16 close to origin 14. Detected touches located close to origin 14 result in smaller and/or slower changes in a control variable, or smaller and/or slower stepping through a scrollable list of data elements. FIG. 2E depicts a touch 24 located a larger distance away from origin within section 16. Detected touches located farther away from origin 14 result in larger and/or faster changes in a control variable, or larger and/or faster stepping through a scrollable list of data elements.

In one non-limiting example, a single touch as depicted in any of FIGS. 2A through 2E results in a fixed change in a control variable or a fixed jump through a scrollable list of data elements, where the distance the touch is located away from the origin determines the size of the change or jump. In another non-limiting example, touching and holding in a particular location results in a continuous change in a control variable or a continuous scrolling through a list of data elements, where the location of the touch determines the rate of change and the direction of change. A touch and hold in a location close to origin 14 as shown in FIG. 2D results in a slow continuous change, and a touch and hold in a location farther away from origin 14 as shown in FIG. 2E results in a faster continuous change, where the section on either side of origin 14 in which the touch is detected determines the direction of the change.

In one non-limiting example, a touch in a location is followed by a sliding of the touch location without lifting the user's finger or touch implement (such as a passive or active stylus). A touch in a location followed by a slide away from origin 14 results in an increasing rate of change in a control variable or an increased rate of scrolling through a scrollable list of data elements. A touch in a location followed by a slide towards origin 14 results in a decreasing rate of change in a control variable or a decreasing rate of scrolling through a scrollable list of data elements. A touch in a location followed by a slide towards the origin which then crosses the origin into the adjoining section results in an initial rate of change which at first decreases as the slide approaches the origin, and then starts to increase once the origin is crossed and the slide is moving away from the origin, where the direction of the change switches when the origin is crossed.

In one non-limiting example, a touch in a location followed by a slide away from origin 14 results in an increasing rate of change in a control variable or an increased rate of scrolling through a scrollable list of data elements. However, in this example, any subsequent slide during the same touch event (the touch of the display has been maintained continuously from the first touch) towards the origin 14 results in a change in the direction of change of a control variable or a change in the direction of scrolling through a scrollable list of data elements. In other words, a touch and slide in a first direction away from origin 14 results in an increasing rate of change of the controlled variable (the direction of change determined by the section in which the touch is detected), but a change in direction of the slide back towards the origin, even if the touch remains in the same section and has not crossed over origin 14, results in an immediate change of direction of the change in the controlled variable. The distance the touch point slides away from the point where the slide reversed direction now determines the rate of change of the control variable or the rate of change in the scrolling through the scrollable list of data elements. Another way to understand this is that a reverse in direction of a slide "resets" the location of origin 14 for the current touch event. The new origin location remains until either the touch event ends by the user discontinuing the touch of the display or by a subsequent change in slide direction during the same touch event, which would again reset the origin location to the point of this later change in slide direction. When the touch event ends, origin 14 resets to its default location as shown in FIG. 2A-2E.

When a touch is first detected, a timer clock is started having a predetermined time increment (for example 100 msec.). At each occurrence of the predetermined time increment as long as touch is still maintained, a controlled variable is caused to change or a pointer to a location within a scrollable list of data elements is caused to change. The amount of change is determined by a step size variable. The direction of change is determined by a location variable. The value of the step size variable is a function of the distance the current touch location is from the origin. The farther away from the origin the touch is, the larger the step size. If at the next time increment a touch is not detected, the timer stops and the touch event ends, and the UI reverts to a standby mode awaiting the next touch, and no further changes to the controlled variable or pointer location are made. As long as a touch is detected, at each time increment the controlled variable value will be incremented or the pointer location will be incremented.

The slide operation described above affects the step size variable. A slide away from origin 14 increases the step size variable. A slide toward the origin may affect the step size differently, depending on how operation of the UI element is configured. In the first slide example, sliding towards the origin results in reducing the step size variable. If the slide crosses the origin, as it crosses the origin and continues away from the origin the step size variable starts to increase in value.

The section in which the touch is detected determines the value of the direction variable. Generally, there will be only two possible values for the direction variable. In the first example above, the direction value has a first predetermined value when touch is detected in section 15, and is associated with decreasing a control variable value or scrolling in a first direction through a scrollable list of data elements, and the direction variable has a second predetermined value when a touch is detected in section 16, which is associated with increasing the value of a control variable or scrolling in a second direction through a scrollable list of data elements.

In the second example described where the direction of change of the controlled variable switches if a slide direction changes, it is easiest to understand this in the context of re-setting the origin when the slide direction reverses. That is, when the touch event begins the location of the origin is predetermined and fixed. However, once a change in slide direction during the same touch event is detected, the location of the origin is reset to be the location where the change in slide direction occurred. In this case, the distance variable is now computed as the distance from the new origin location, and the direction variable is determined based on whether or not the current touch location is to the left or right of (or on one side of or the other side of) the new origin location.

Figure 3A:
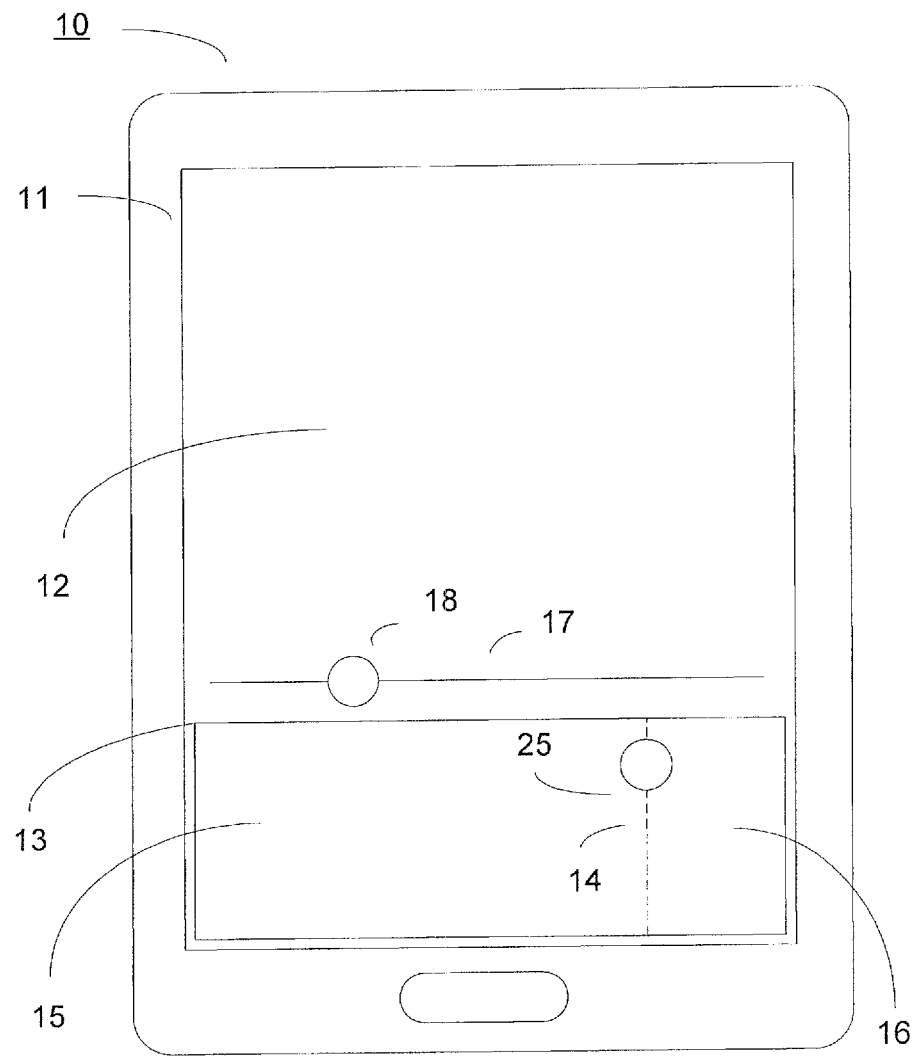
FIG. 3A is a schematic representation of an electronic device incorporating an implementation of a user interface element.
Figure 3B:
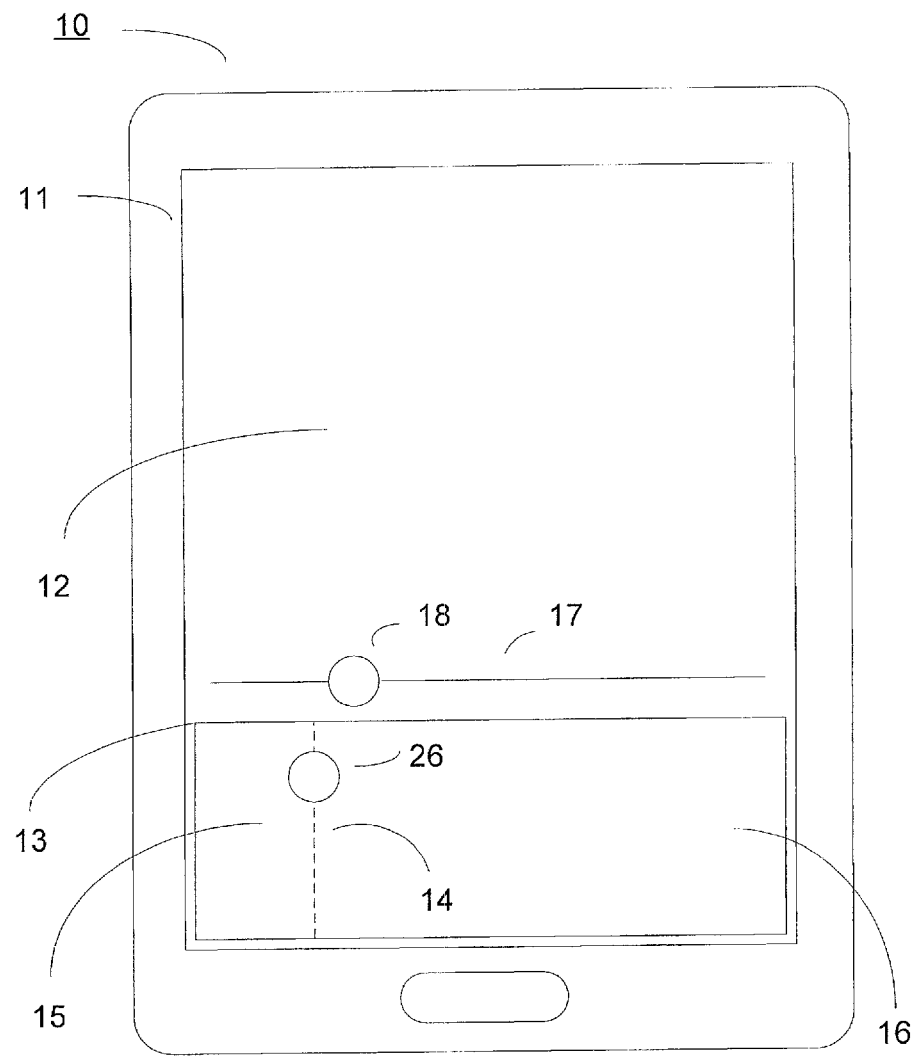
FIG. 3B is a schematic representation of an electronic device incorporating an implementation of a user interface element.

Turning now to FIGS. 3A-3B, operation of another non-limiting example is depicted. In this example, the origin 14 is no longer fixed. The location of origin 14 is determined by a first touch within the touch region 13. The first touch does not change any control variable or location in a scrollable list of data elements, it just sets the location of origin 14. Once the first touch sets the origin location, a slide to either one side or the other of the origin (generally to either the right or left, but in some examples the region may be aligned in a direction other than horizontal, for example vertically) determines the direction in which a control variable is changed or the direction through which a location in a scrollable list of data elements is changed. The distance the slide is moved away from the origin determines the rate at which the control variable is changed or the rate at which the location in the scrollable list of data elements is changed, where the rate increases with increasing distance away from the origin.

Figure 4A:
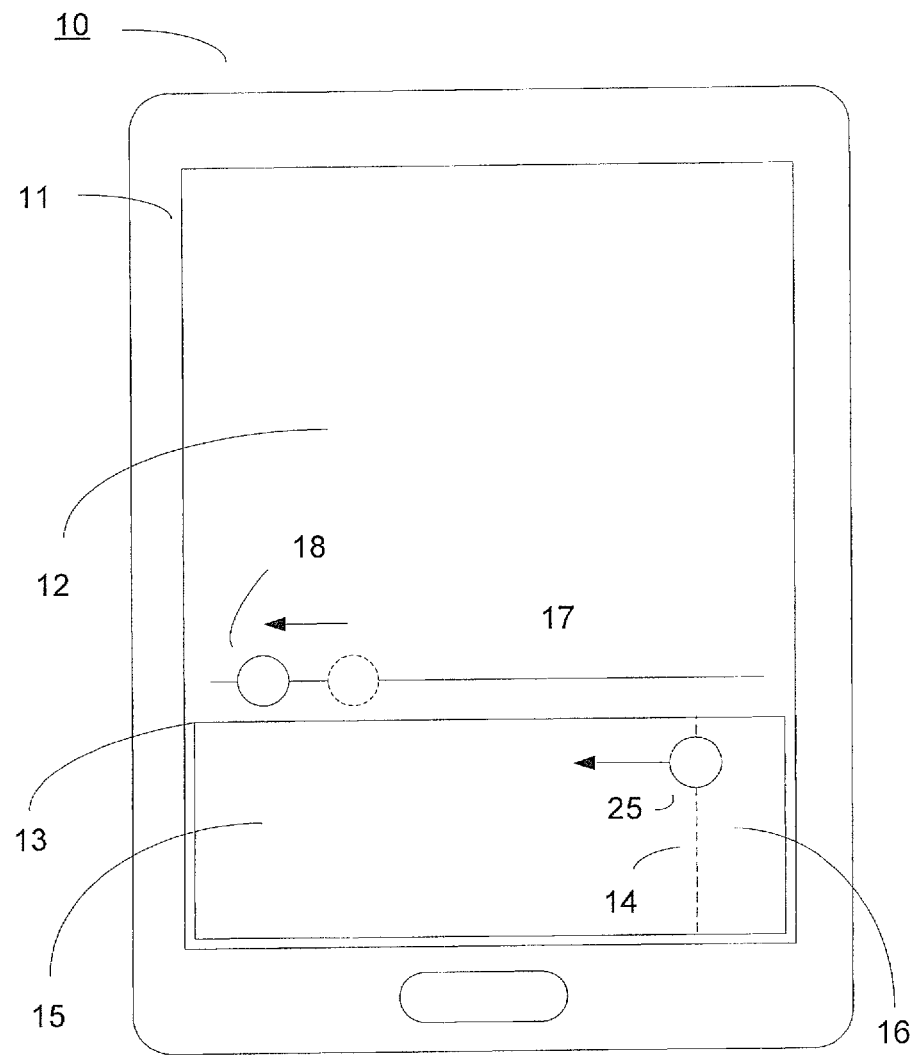
FIG. 4A is a schematic representation of an electronic device incorporating an implementation of a user interface element.
Figure 4B:
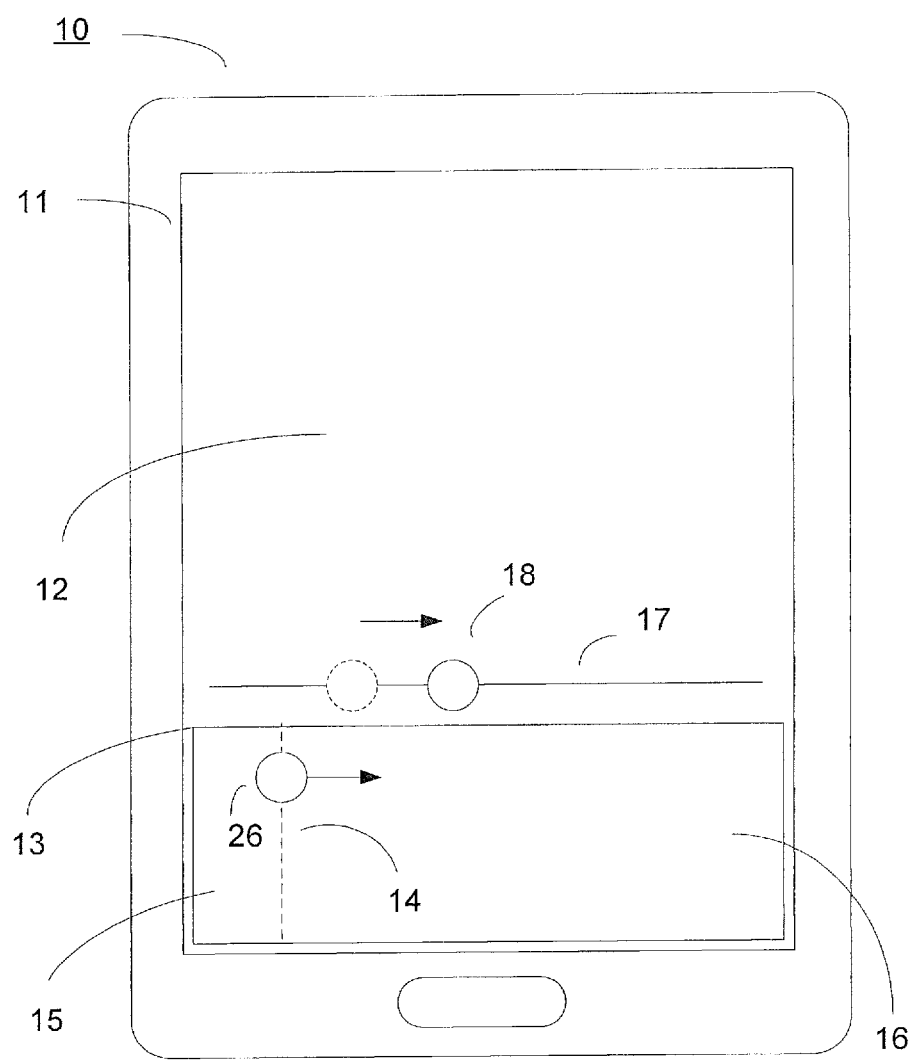
FIG. 4B is a schematic representation of an electronic device incorporating an implementation of a user interface element.

Touch and slide operations are depicted in FIG. 3A in combination with FIG. 4A, and FIG. 3B in combination with FIG. 4B. FIG. 3A depicts an initial touch 25, which is located toward the right side of display touch region 13 and sets the location of origin 14 as shown. FIG. 4A depicts a slide to the left from the initial touch location 25. This causes a control variable associated with the UI or a location within a scrollable list of data elements to change in a first direction. Control indicator 18 moves to the left in response to the leftward slide, and is associated with the decreasing control variable value or moving in the first direction through a scrollable list of data elements. The rate of change of the decreasing or the scrolling is determined by how far the slide moves relative to the origin 14.

FIGS. 3B and 4B depict a separate touch event. As shown in FIG. 3B, a touch 26 is located toward the left side of display touch region 13 and sets the location of axis 14 as shown. FIG. 4B depicts a slide to the right after the initial touch 26. This causes a control variable associated with the UI or a location within a scrollable list of data elements to change in a second direction. Control indicator 18 moves to the right in response to the rightward slide, and is associated with the increasing control variable value or moving in the second direction through the scrollable list of data elements. The rate of change of the increasing or the scrolling in the second direction is determined by how far the slide moves relative to the origin.

Once a user removes their finger (or stylus or other device used to touch the display) from the display, the particular touch control event ceases and the system reverts to a standby mode where it awaits the next touch event. Once a touch event ends, the location of the origin in the variable origin examples is no longer set, and is free to be located anywhere the user desires within touch region 13 with a subsequent touch event.

Previous examples with an initial fixed origin described behavior that may occur during a single touch event where a change in a direction of slide occurs. Similar behavior can be applied in the examples with variable initial origin position described above, the only difference being the position of the origin upon initiation of a touch event.

In some examples, a touch sensitive display may also be capable of sensing the force of a touch. In such a force sensitive display, the force applied in a touch event can be used for control of certain aspects of the element to be controlled. In one example where the origin is fixed, as shown in FIGS. 2A through 2E, force can be used to take the place of distance of the touch location from the origin. In this example, a touch anywhere to the right of the origin 14 within section 16 causes change in a first direction, and a touch anywhere to the left of origin 14 in section 15 causes change in a second direction, and the rate of change is determined by the force of the touch. In one non limiting example, a larger force is associated with a faster rate of change and a smaller force is associated with a slower rate of change (though larger force could be associated with a slower rate of change if desired).

In the variable origin examples depicted in FIGS. 3A-3B and 4A-4B, a force sensitive touch capability may be used as follows. An initial touch as depicted in FIGS. 3A or 3B sets a location for origin 14. A slide in one direction is associated with a change of a control variable or a scroll through a scrollable list of data elements in a first direction. The force applied while sliding determines the rate or change of the control variable or the rate at which scrollable data elements are scrolled through.

The examples described above with variable origin location can be implemented in a quite similar manner as was described for the fixed origin UI examples. In these examples, the only substantial difference is that the timer clock does not need to start when the touch is first detected, as the first touch sets the origin location. The timer can start as soon as a slide away from the origin is detected. From this point on, operation is the same.

When a slide after the initial touch is detected, the timer clock is started having a predetermined time increment (for example 100 msec.). At each occurrence of the predetermined time increment as long as touch is still maintained, a controlled variable is caused to change or a pointer to a location within a scrollable list of data elements is caused to change. The amount of change is determined by a step size variable. The direction of change is determined by a location variable. The value of the step size variable is determined based on the distance the current touch location is from the origin. The farther away the current touch location is, the larger the step size. If at the next time increment a touch is not detected, the timer stops, the touch event ends and the UI reverts to a standby mode awaiting the next touch. As long as a touch is detected, at each time increment the controlled variable value will be incremented or the pointer location will be incremented.

A slide away from origin 14 increases the step size variable. A slide back toward the origin (it is not possible to initially slide towards the origin as the initial touch location will always be the origin) may affect the step size differently, depending on how operation of the UI element is configured. In one example, sliding back towards the origin results in reducing the step size variable. If the slide crosses the origin, as it continues away from the origin the step size variable increases in value.

The section in which the touch is detected after the slide begins determines the value of the direction variable. Generally, there will be only two possible values for the direction variable. The direction variable has a first predetermined value when touch is detected in section to the left of the origin and is associated with decreasing a control variable value or scrolling in a first direction through a scrollable list of data elements, and the direction variable has a second predetermined value when a touch is detected in a section to the right of the origin, and is associated with increasing the value of a control variable or scrolling in a second direction through a scrollable list of data elements. It should be noted that right and left described above could be reversed, or other orientations of the control such as vertical or diagonal may result in different descriptions for the two zones (on a first side of or a second side of an origin, above or below an origin, diagonally up to the right or diagonally down to the left of a diagonal origin, etc.) without limitation.

In a second example where the direction of change switches if a slide direction changes, it is easiest to understand in the context of re-setting the location of the origin when the slide direction reverses. In this case, the distance variable is now computed as the distance from the new origin location, and the direction variable is determined based on whether or not the current touch location is to the left or right of (or on one side of or the other side of) the new origin location. The value of the control variable continues to change until the touch event ends, as before.

It should be understood that the rate of change of the control variable or the rate of change of a pointer to a data element in a list of scrollable data elements can be controlled using other well-known methods. For example, rather than change step size, or could change the clock timer such that the time increment changed as a function of the distance of a touch location from the origin. The step size could remain fixed, or in another implementation both could change. Other methods for changing the rate of change could also be implemented and are contemplated herein.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A method for operating a user interface (UI) of an electronic device having a touch sensitive display comprising:
   providing on the touch sensitive display a touch region having first and second touch zones separated by a first origin axis preset by the UI, wherein the origin axis can be located anywhere within the touch region,
   detecting the location of a touch by a user in the touch region,
   determining whether the touch is located in the first touch zone or the second touch zone,
   determining a distance between the detected location of the touch by the user and the first origin axis,
   responsive to the detecting of the location of the touch in the touch region, causing one of: an increasing change in a controlled variable when the touch location is determined to be in the first touch zone or a decreasing change in the controlled variable when the touch location is determined to be in the second touch zone,
   wherein the rate of change of the controlled variable is dependent on the distance the detected touch location is displaced away from the origin axis.

2. The method of claim 1 wherein the value of the controllable variable is continually changed as long as a touch is detected.

3. The method of claim 1 wherein the value of the controllable variable stops changing when a touch is no longer detected.

4. The method of claim 1 wherein the origin axis is located in a fixed, predetermined location on the touch sensitive display.

5. The method of claim 4 further comprising:
   sliding the location of the touch in a direction away from the origin axis to change the distance of the touch from the origin axis, and
   updating the rate of change of the controlled variable based on the change in distance of the location of the touch from the origin axis.

6. The method of claim 5 further comprising:
   sliding the touch location towards the origin axis, whereupon when the sliding direction is changed from being away from the origin axis to being towards the origin axis, the change in the value of the controlled variable is switched to be decreasing if it was previously increasing, or switched to be increasing if it was previously decreasing in value.

7. The method of claim 1 wherein the location of the origin axis on the touch sensitive display is variable and is set by a first detected touch location, wherein the rate of change of the value of the controllable variable is determined by the detection of subsequent touch locations.

8. The method of claim 7 further comprising sliding the location of the touch in a direction away from the origin axis and updating the rate of change of the value of the controlled variable based on the change in distance of the location of the touch from the origin axis, as the touch location is slid away from the origin axis.

9. The method of claim 8 further comprising:
   switching the direction in which the value of the controllable variable is changed when the direction of sliding is reversed.

10. A method for operating a user interface (UI) of an electronic device having a touch sensitive display comprising:
    providing on the touch sensitive display a touch region having first and second touch zones separated by a first origin axis preset by the UI, wherein the origin axis can be located anywhere within the touch region,
detecting the location of a touch in the touch region,
determining whether the touch is located in the first touch zone or the second touch zone,
determining a distance between the detected location of the touch by the user and the first origin axis,
responsive to the detecting of the location of the touch in the touch region, causing one of: a change, in a first direction, of a pointer location pointing to a data element in a list of scrollable data elements when the touch location is determined to be in the first touch zone or a change, in a second direction, of the pointer location pointing to a data element in a list of scrollable data elements when the touch is determined to be in the second touch zone,
wherein the rate of change in the pointer location is dependent on the distance the detected touch location is displaced away from the origin axis.

11. The method of claim 10 wherein the pointer location is continually changed as long as a touch is detected.

12. The method of claim 10 wherein the pointer location stops changing when a touch is no longer detected.

13. The method of claim 10 wherein the origin axis is located in a fixed, predetermined location on the touch sensitive display.

14. The method of claim 13 further comprising:
sliding the location of the touch in a direction away from the origin axis to change the distance of the touch from the origin axis, and
updating the rate of change of the pointer location based on the change in distance of the location of the touch from the origin axis.

15. The method of claim 14 further comprising:
sliding the touch location towards the origin axis, whereupon when the sliding direction is changed from being away from the origin axis to being towards the origin axis, the change in the pointer location is switched to be in the second direction if it was previously in the first direction, or switched to be in the first direction if it was previously in the second direction.

16. The method of claim 10 wherein the location of the origin axis on the touch sensitive display is variable and is set by a first detected touch location, wherein the rate of change of the pointer location is determined by the detection of subsequent touch locations.

17. The method of claim 16 further comprising sliding the location of the touch in a direction away from the origin axis and updating the rate of change of the pointer location based on the change in distance of the location of the touch from the origin axis, as the touch location is slid away from the origin axis.

18. The method of claim 17 further comprising:
switching the direction in which the pointer location is changed when the direction of sliding is reversed.

19. A method for operating a user interface (UI) of an electronic device having a touch sensitive display comprising:
providing on the touch sensitive display a touch region,
responsive to a touch at a first location by a user in the touch region, setting a location of an origin axis at the location of the first touch and establishing first and second touch zones separated by the origin axis, wherein the origin axis can be located anywhere within the touch region;
detecting a slide of the first touch away from the origin axis;
determining the distance between the slide of the detected touch location by the user and the origin axis,
determining if the slide of the first touch is toward the first touch zone or the second touch zone;
responsive to the detecting of the slide of the touch away from the origin axis, causing one of: an increasing change in a controlled variable when the slide is toward the first touch zone or a decreasing change in the controlled variable when the slide is toward the second touch zone,
wherein the rate of change of the controlled variable is dependent on the distance the slide moves the touch location away from the origin axis.

20. A method for operating a user interface (UI) of an electronic device having a touch sensitive display comprising:
providing on the touch sensitive display a touch region,
responsive to a touch at a first location by a user in the touch region,
setting a location of an origin axis at the location of the first touch and establishing first and second touch zones separated by the origin axis, wherein the origin axis can be located anywhere within the touch region;
detecting a slide of the first touch away from the origin axis;
determining the distance between the slide of the detected touch location by the user and the origin axis,
determining if the slide of the first touch is toward the first touch zone or the second touch zone;
responsive to the detecting of the slide of the touch away from the origin axis, causing one of:
a change, in a first direction, of a pointer location pointing to a data element in a list of scrollable data elements when the slide is toward the first touch zone, or;
a change, in a second direction, of the pointer location pointing to a data element in the list of scrollable data elements when the slide is toward the second touch zone,
wherein the rate of change of the change in the pointer location is dependent on the distance the slide moves the touch location away from the origin axis.

* * * * *